United States Patent [19]

Meador

[11] 4,422,043

[45] Dec. 20, 1983

[54] ELECTROMAGNETIC WAVE LOGGING DIPMETER

[75] Inventor: Richard A. Meador, Spring, Tex.

[73] Assignee: Texaco Development Corporation, White Plains, N.Y.

[21] Appl. No.: 244,391

[22] Filed: Mar. 16, 1981

[51] Int. Cl.³ .............................................. G01V 3/30
[52] U.S. Cl. .................................................... 324/338
[58] Field of Search ........................ 324/333, 338–341, 324/367, 374

[56] References Cited

U.S. PATENT DOCUMENTS

| | | | |
|---|---|---|---|
| 2,963,641 | 12/1960 | Nanz | 324/376 |
| 3,944,910 | 3/1976 | Rau | 324/338 |
| 4,019,126 | 4/1977 | Meador | 324/333 |
| 4,107,598 | 8/1978 | Meador et al. | 324/341 |
| 4,130,793 | 12/1978 | Bridges et al. | 324/341 |
| 4,251,773 | 2/1981 | Cailliau et al. | 324/367 X |
| 4,383,220 | 5/1983 | Baldwin | 324/338 |

Primary Examiner—Gerard R. Strecker
Attorney, Agent, or Firm—Carl G. Ries; Jack H. Park; Ronald G. Gillespie

[57] ABSTRACT

An improvement to dipmeter logs has very closely spaced radio frequency sensor coils mounted in pairs in each of the formation contacting pads. A transmitter mounted in a sonde emits the radio frequency energy, such as in the range of from two to one hundred megahertz. The phase difference in radio frequency signals between receiver coil pairs in each pad is measured, providing improved data resolution for computing formation dip, and making possible dip measurements in wells drilled with oil base mud or air (invert type muds).

12 Claims, 6 Drawing Figures

ELECTROMAGNETIC WAVE LOGGING DIPMETER

BACKGROUND OF INVENTION

1. Field of Invention

The present invention relates to electromagnetic wave propagation well logging dipmeters.

2. Description of Prior Art

U.S. Pat. No. 4,019,126, is one of which applicant is inventor, and is assigned to the assignee of the present application. The structure of this patent involved a well logging dipmeter with radio frequency oscillators having coils causing flux lines to circulate through earth formations adjacent a well borehole. Changes in the adjacent earth formations caused current in the oscillator circuit to change and these changes were recorded as data after transmission to surface electronics. Based on the recorded data, dip of different earth formations could then be obtained as a function of borehole depth.

Other U.S. Patents of interest to the present invention were of two types. U.S. Pat. Nos. 2,167,630; 3,187,752; 3,510,757 and 3,609,521 although the general interest, contained the sensing instrumentation entirely within the sonde. U.S. Pat. Nos. 3,388,323 and 3,068,400 included a portion of the circuitry outside the sonde mounted in pads in contact with the earth formations adjacent the borehole. In U.S. Pat. No. 3,068,400, a current electrode and a measuring electrode were mounted in each of three pads. In U.S. Pat. No. 3,388,323, magnetic field sensors mounted in the pads sensed both a primary magnetic field, which was predominantly based on the magnetic susceptibility of the formation, and also a secondary magnetic field generated by eddy currents, which was indicative of formation electrical conductivity. These field readings were separated in phase separation circuits and used to determine formation dip.

Other dipmeter logs in commercial use have utilized as many as four pads. However, the signal to noise ratio, that is, the indication of formation boundary versus other unwanted signals, at times posed problems.

SUMMARY OF INVENTION

Briefly, the present invention provides a new and improved radio frequency well logging dipmeter for determining dip of subsurface formations adjacent a well borehole regardless of borehole fluid. A transmitter coil which emits radio frequency electromagnetic waves is mounted in a sonde for movement in the well borehole. Plural transmitter coils, one mounted in each of plural formation contacting pads may alternatively be used. At least four pads are mounted with the sonde for contacting subsurface formation walls at selected depths in the well borehole. Mounted in each of these pads are a plurality of radio frequency sensor coils, typically a pair, for sensing the waves emitted from the transmitter coil. An electronic circuit, which includes a receiver electronic circuit mounted in the sonde and a surface electronic circuit, form a measure of the phase difference between the waves sensed in the sensor coils in the respective pads, thus providing four measurements, each with good resolution, for determining borehole dip.

DESCRIPTION OF PREFERRED EMBODIMENT

Figures 1, 2:
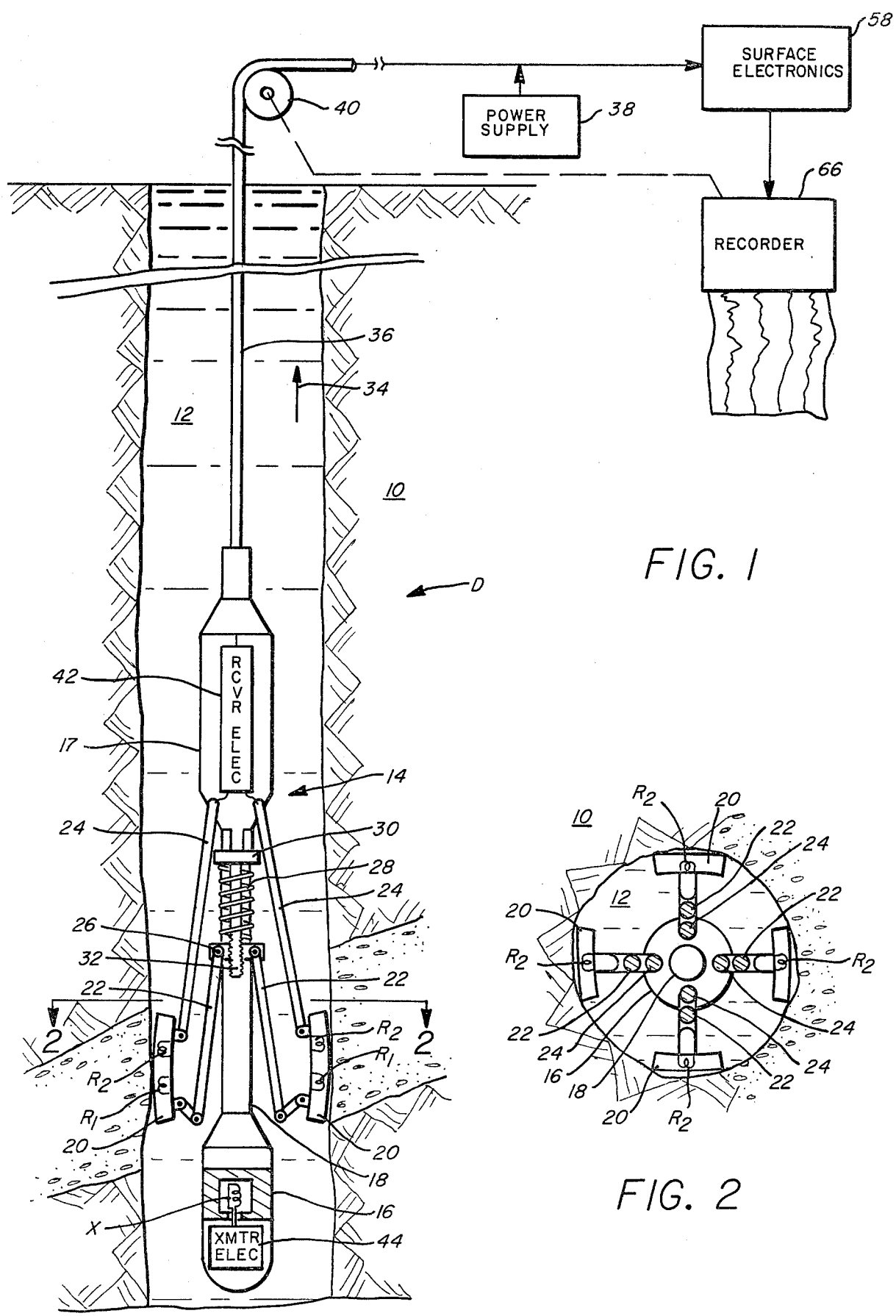
FIG. 1 is a schematic diagram, partly in cross-section, of a first embodiment of a well logging dipmeter of the present invention in a well borehole adjacent subsurface formations.
FIG. 2 is a cross-sectional view taken along the lines 2—2 of FIG. 1.

In the drawings, the letter D designates generally an electromagnetic wave propagation well logging dipmeter according to the present invention for obtaining measurements of the dip of formations 10 adjacent a well borehole 12. The dipmeter D includes a transmitter coil X mounted in a sonde 14 at a lower sonde portion 16. The sonde 14 includes an upper sonde portion 17 interconnected to the lower portion 16 by an intermediate sonde section 18.

As is conventional, suitable other instrumentation is provided in the sonde 15 to obtain measurements of the geometry of the dipmeter D in the borehole 12 as well as the angle of dip of the sonde 14 in the borehole 12. Since this instrumentation is conventional and known to those of ordinary skill in the art, descriptive details thereof are not shown in the drawings.

At least three, and preferably four, pads 20 are movably mounted with respect to the sonde 14 so that they may be selectively brought into engagement with the walls of the formations 10 adjacent the borehole 12. By way of example, the pads 20 may be pivotally mounted at the outer ends of linkage arms 22 and 24. The arms 22 are also pivotally mounted at their inner end to a movable lower collar member 26 mounted with the intermediate sonde section 18, while the arms 24 are pivotally mounted at their inner ends to the upper sonde portion 17.

The pads 20 are normally urged outwardly into contact with the formation walls due to the force exerted by a spring 28 mounted between the lower collar member 26 and an upper stop ring or collar 30 mounted with the intermediate sonde section 18. A screw or other threaded member 32 engages the movable collar 26 and responds to a suitable hydraulic or electrical actuator to move collar member 26 upward or downward as required. Upward movement of the collar 26 overcomes the force exerted by the spring 28 and moves the pads 20 out of contact with formation walls so that the sonde 14 may be moved upwardly or downwardly in the borehole 12. It should be understood that the foregoing structure for moving the pads into engagement with the walls of formations 10 is given by way of an example. As will be appreciated by those in the art, other suitable structure may be provided to selectively move the pads 20 into contact with the formation walls, if desired.

The dipmeter D includes at least two receiver coils $R_1$ and $R_2$ mounted in a receiver coil pair in each of the pads 20. The receiver coils $R_1$ and $R_2$ in each pad 20 are closely spaced from each other a predetermined distance, such as approximately one inch. It should be understood that this spacing is an example spacing and that other suitable spacings could equally well be used.

Figure 3:
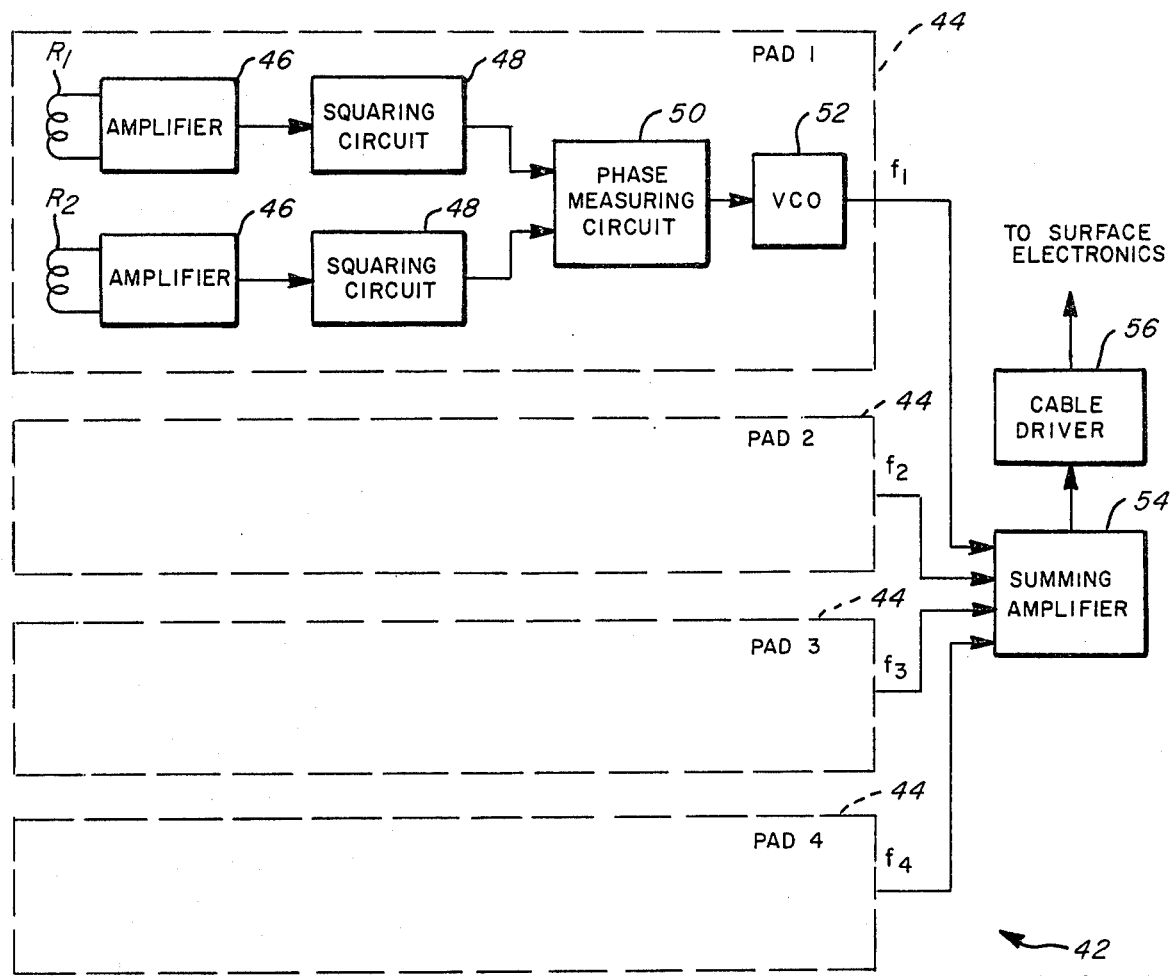
FIG. 3 is a schematic electrical circuit diagram of a sub-surface receiver electronic circuit in the apparatus of FIG. 1.

The sonde 14 is moved through the borehole 12 along its longitudinal axis as indicated by arrow 34 in response to the movement of a logging wireline or cable 36. The receiver coils $R_1$ and $R_2$ receive operating electrical power from a power supply 38 at a surface location adjacent the well borehole 12 by means of the wireline 36 which passes over a sheave wheel 40. Operating electrical power from the power supply 38 is also provided through suitable conventional connections to a receiver electronics circuit 42 (FIGS. 1 and 3) from the wireline 36. Power and control signals are also provided over the wireline 36 to the actuator for the threaded member 32.

The transmitter coil X is energized to emit radio frequency electromagnetic waves, typically in the range of from two to one hundred megahertz, by a transmitter electronic circuit 44 of conventional construction. Operating electrical power for the transmitter electronic circuit 44 is provided through properly isolated supply lines from the receiver electronics 42 which gets its power from power supply 38. Power can also be supplied from suitable electrical batteries in the lower portion 16 of the sonde 18 rather than by conductors from the power supply 38.

The radio frequency waves from the transmitter coil X travel through the borehole 12 and formation 10 and are received by the receivers $R_1$ and $R_2$ in each of the pads 20. The receiver coils $R_1$ and $R_2$ in the pads 20 are each connected through suitable conductors in the arms 24 to an individual signal processing channel 44 (FIG. 3) in the receiver electronics 42. Each of the signal processing channels 44 is connected to a particular receiver coil pair $R_1$ and $R_2$ in one of the pads 20. Other than being connected to a different receiver coil pair, the signal processing channels 44 are of like construction and function and accordingly the structural details of only one are set forth in the drawings, it being understood that the other signal processing channels 44 contain corresponding components.

Each of the receiver coils $R_1$ and $R_2$ in a particular receiver coil pair are connected to a separate radio frequency (RF) amplifier 46 and a squaring circuit 48. The output of the squaring circuits 48 for the receiver coils $R_1$ and $R_2$ are furnished to a phase measuring circuit 50 which forms a measure of the phase difference between the waves sensed by the sensor coils $R_1$ and $R_2$. A voltage controlled oscillator 52 is electrically connected to the phase measuring circuit 50 and forms an output signal varying in frequency and proportion to the phase difference in the waves detected in the phase measuring circuit 50. The voltage controlled oscillators in the various signal channels 44 each have different center frequencies designated as $f_1$, $f_2$, $f_3$ and $f_4$ in order to protect the information integrity of the different signals.

Figure 4:
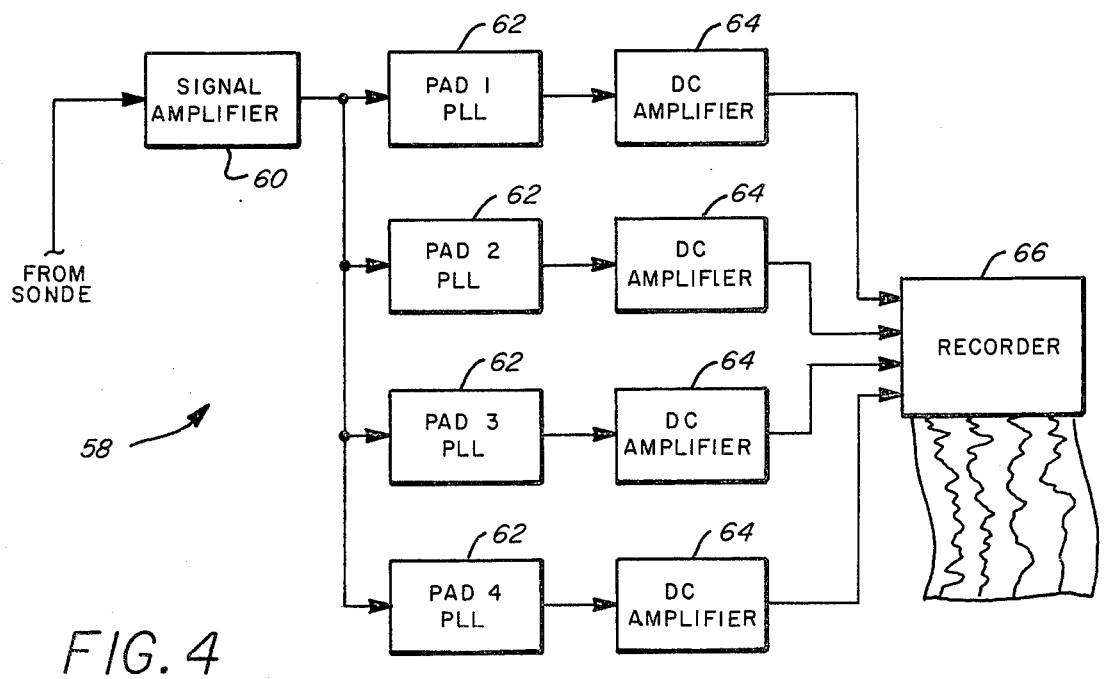
FIG. 4 is a schematic electrical circuit diagram of a surface electronic circuit in the apparatus of FIG. 1.

Variations in the measure of phase difference detected in the phase measuring circuit 50 cause variations in the output frequencies of the oscillators 52. The outputs from oscillators 52 in the signal channels 44 for each pad 20 are furnished to a summing amplifier 54 which combines the output signals from the signal channels 44 and furnishes them to a cable driver 56 which transmits the combined output signals over the logging cable 36 to a surface electronics circuit 58 (FIGS. 1 and 4).

In the receiver electronics circuit 58, the signals from the cable 36 are received in a signal amplifier 60 and amplified and furnished to four phase locked loops 62 which divide the signal transmitted over the logging cable 36 into signal channels, one for each of the pads 20, based on the frequencies of the oscillators 52 in the sonde 15. The phase locked loops 62 further form a measure of the phase difference obtained in the phase measuring circuits 50 for the particular one of the pads 20 associated therewith.

The output from each of the phase locked loops 62 is then provided through amplifiers 64 to a recorder 66 which provides a record of the measures of phase difference formed in the dipmeter D. The recorder 66 is further connected to the sheave wheel 40 so that the results may be plotted as a function of depth in the borehole.

Figure 5:
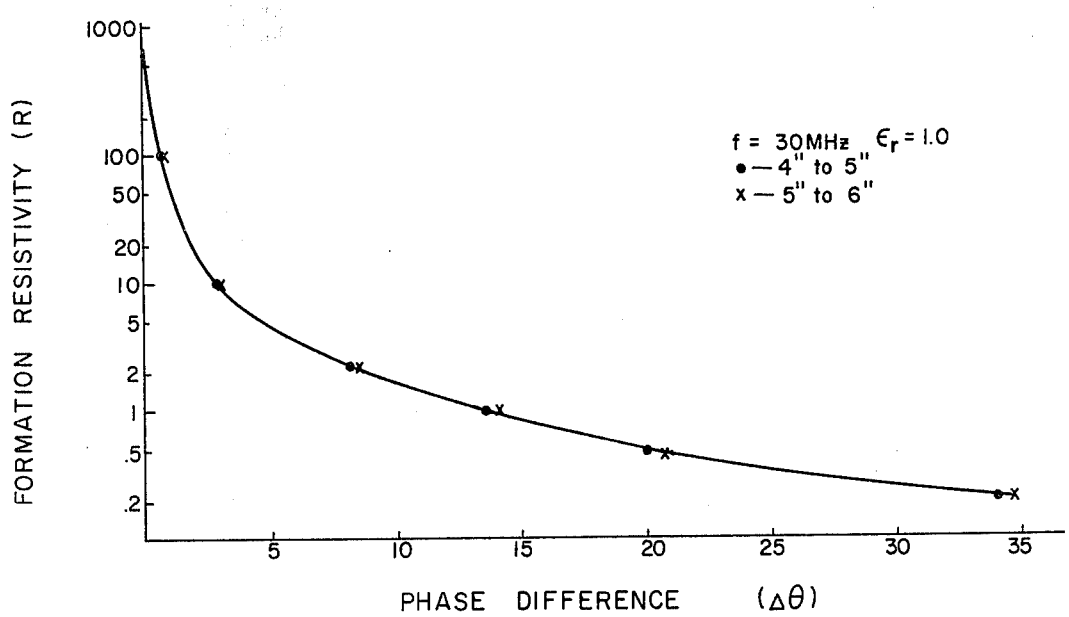
FIG. 5 is an example graph displaying resistivity as a function of phase difference.

In the operation of the present invention, the sonde 14 is lowered into the borehole 12 to a position adjacent a particular formation of interest. The pads 20 are then brought into engagement with the subsurface formation walls at the selected depth of interest in the manner set forth above and the transmitter coil X activated. The transmitter coil X emits radio frequency electromagnetic waves which travel through the borehole 10 and formation 12 and are sensed by the receiver coil pairs $R_1$ and $R_2$ in each of the four pads 20. The receiver electronics circuit 42 in the upper sonde portion 17 forms a measure of the phase difference between the electromagnetic waves sensed in the receiver coil pairs of the four pads 20, and the four measurement so obtained are transmitted by means of the logging cable 36 to the surface electronics circuit 58. In the surface electronics, the signals received from the cable 36 are separated into channels according to the pads 20 and the phase differences are determined to form an indication of the dip of the well borehole. The recorder 56 then provides a record of the measure of phase differences, $\Delta\theta$, so obtained as a function of borehole depth. The results so obtained may be furnished to a suitable signal processing circuit or computer for determination of actual formation dip. For example, FIG. 5 is an example plot of formation resistivity R as a function of phase difference $\Delta\theta$. With the present invention, an improved signal-to-noise ratio, i.e., an improved formation boundary indication versus other unwanted signals, may be obtained and formation dip may be obtained in wells drilled with nonconductive mud.

Figure 1A:
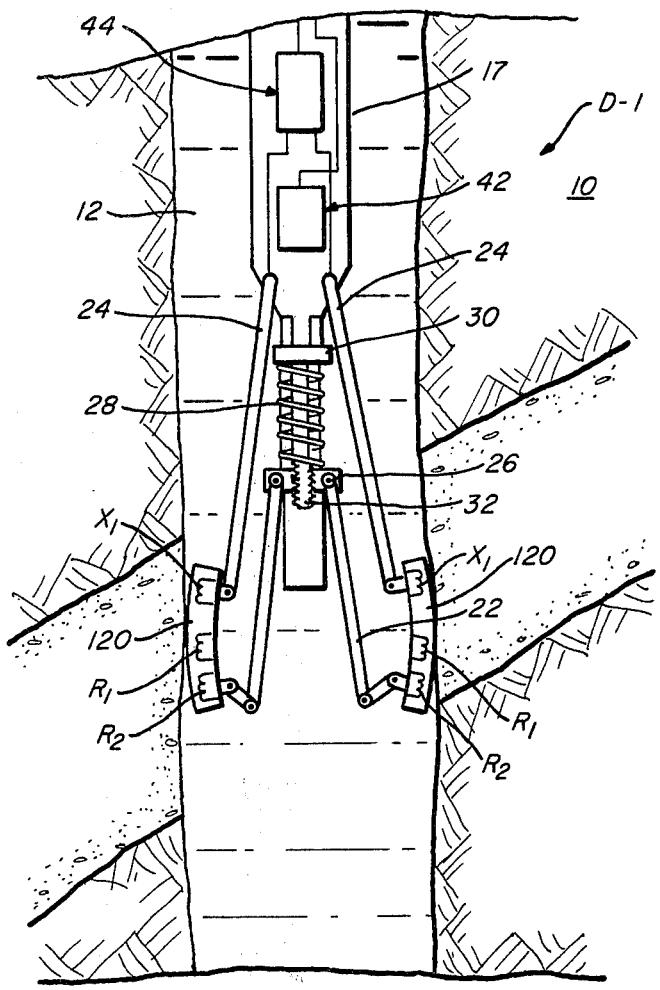
FIG. 1A is a schematic diagram, partly in cross-section of an alternative embodiment of a well logging dipmeter of the present invention is a well borehole adjacent subsurface formations.

In an alternative electromagnetic wave propagation well logging dipmeter D-1 (FIG. 1A), receiver coils $R_1$ and $R_2$ are mounted in each of a plurality of pads 120. As with the dipmeter D, at least three, and preferably four, such pads 120 are provided. In the dipmeter D-1, however, transmitter coils $X_1$ are mounted in each of the pads 120 rather than having a single transmitter coil in the lower sonde portion 16. Each of the transmitter coils $X_1$ and the receiver coils $R_1$ and $R_2$ are preferably covered with a suitable shielding material, such as split metal copper tubes except in the vicinity of the portions of the pad contacting the walls of subsurface formations adjacent borehole 12 to allow improved regional investigation of formations. Further, the electronic circuitry to drive the coils $X_1$ is mounted in the sonde portion 17. Other than these modifications, the remaining structure of the dipmeter D-1 corresponds to that of the dipmeter D and accordingly like reference numerals are used.

In the dipmeter D-1, each of the transmitter coils $X_1$ operates at slightly different frequencies from the other transmitter coils. Typically, the transmitter coils $X_1$ operate at a higher frequency than would the single transmitter coil X in the sonde 17. The frequencies of the coils $X_1$ should differ by at least a few kilohertz to prevent interference. However, it should be understood that frequencies differing on the order of one megahertz could as well be used.

In the operation of the dipmeter D-1, the transmitter $X_1$ in each of the pads are activated and the differences in phase angle, $\Delta\theta$, are measured, in the surface electronics unit 58 (FIG. 1), between the signals received at the receiver coils $R_1$ and $R_2$ mounted in the common pad 120 with each transmitter coil $X_1$. From the measured phase angle difference, $\Delta\theta$, the resistivity R (FIG. 5) of the formation and consequently formation dip may be ascertained in the manner set forth above.

The foregoing disclosure and description of the invention are illustrative and exemplary thereof, and various changes in the size, shape, materials, components, circuit elements, wiring connections and contacts, as well as in the details of the illustrated circuitry and construction may be made without departing from the spirit of the invention.

I claim:

1. A radio frequency well logging dipmeter for determining dip of subsurface formations adjacent a well borehole, comprising:
    (a) a sonde for movement in the well borehole;
    (b) transmitter means in said sonde for emitting radio frequency electromagnetic waves at a frequency in a preferred range of two megahertz to one hundred megahertz;
    (c) at least three pads mounted with said sonde for contacting subsurface formation walls at selected depths in the well borehole;
    (d) a plurality of radio frequency sensor coils mounted in a manner so that a common axis of the sensor coils is substantially parallel to the longitudinal axis of the well borehole when in use on each of said pads for sensing the water emitted from said transmitter means;
    (e) electronic circuit means for forming a measure of the phase difference between the waves sensed by said sensor coils for each one of said pads to form an indication of the dip of the well borehole.

2. The structure of claim 1, wherein said electronic circuit means include:
    (a) a surface electronic circuit mounted at the earth's surfaace for forming a measure of the phase difference between the waves sensed by said sensor coils in each one of said pads;
    (b) means for providing a record of the measures of phase difference formed in said surface electronic circuit.

3. The structure of claim 1, wherein said electronic circuit means comprises:
    a receiver electronic circuit mounted in said sonde, comprising a plurality of phase measuring circuits, one associated with each of said pads, for forming a measure of the phase difference between the waves sensed by said sensor coils in each one of said pads.

4. The structure of claim 3, wherein each of said phase measuring circuits includes oscillator means for forming an output signal varying in frequency in proportion to the phase difference between the waves.

5. The structure of claim 4, wherein each of said oscillator means in said phase measuring circuits has a different center frequency.

6. The structure of claim 5, wherein said sonde is supported by a logging cable in the borehole and further including:
    (a) means for combining the output signals from said oscillator means of said phase measuring circuits;
    (b) means for transmitting the combined output signal over the logging cable to said surface electronic circuit.

7. The structure of claim 6, wherein said surface electronic circuit includes:
    means for dividing the signal transmitted over the logging cable into signal channels, one for each of said pads.

8. The structure of claim 7, wherein said surface electronic circuit includes:
    phase-locked loop means for each of said channels for forming a measure of the phase difference from the signal provided thereto.

9. The structure of claim 1, wherein said coils in each said pad are closely spaced with respect to each other.

10. The structure of claim 1, wherein said coils in each said pad are spaced approximately one inch from each other.

11. The structure of claim 1, wherein said pads comprise four pads.

12. The structure of claim 1, wherein said transmitter means comprises at least one transmitter coil mounted in said sonde.

* * * * *